(12) United States Patent
Raffo et al.

(10) Patent No.: US 9,875,260 B2
(45) Date of Patent: Jan. 23, 2018

(54) SYSTEMS AND METHODS OF PROVISIONING DATA STORAGE AND RUNTIME CONFIGURATION IN TELECOMMUNICATIONS SYSTEMS AND DEVICES

(71) Applicant: Dialogic Inc., Milpitas, CA (US)

(72) Inventors: Romolo Raffo, Mountain View, CA (US); Kamlakar N. Patil, San Jose, CA (US); Thien Nguyen, San Jose, CA (US)

(73) Assignee: Dialogic Corporation, Montreal, Quebec (CA)

( * ) Notice: Subject to any disclaimer, the term of this patent is extended or adjusted under 35 U.S.C. 154(b) by 71 days.

(21) Appl. No.: 15/002,534

(22) Filed: Jan. 21, 2016

(65) Prior Publication Data
US 2016/0140148 A1 May 19, 2016

Related U.S. Application Data

(62) Division of application No. 13/364,732, filed on Feb. 2, 2012, now Pat. No. 9,270,528.

(51) Int. Cl.
*G06F 17/30* (2006.01)
*H04L 12/24* (2006.01)

(52) U.S. Cl.
CPC .. *G06F 17/30289* (2013.01); *G06F 17/30312* (2013.01); *H04L 41/0859* (2013.01); *G06F 17/30002* (2013.01)

(58) Field of Classification Search
CPC .................................................. G06F 17/30002
See application file for complete search history.

(56) References Cited

U.S. PATENT DOCUMENTS

| 7,383,271 B2 | 6/2008 | Yip et al. |
| 2008/0104215 A1* | 5/2008 | Excoffier ............ H04L 67/1095 709/223 |

OTHER PUBLICATIONS

Wikipedia, "Git (Software)", Nov. 20, 2013, <http://en.wikipedia.org/wiki/Git_(software), pp. 9.

* cited by examiner

*Primary Examiner* — Hung Q Pham
(74) *Attorney, Agent, or Firm* — BainwoodHuang

(57) ABSTRACT

Systems and methods of provisioning data storage and runtime configuration in telecommunications systems and devices. The systems and methods employ at least one decentralized revision control system as a data repository for storing data, such as configuration data, and at least one data provisioning component as an interface for accessing the configuration data stored in the data repository. By employing the decentralized revision control system in conjunction with the data provisioning component, the systems and methods can provide a data storage and runtime configuration provisioning framework that is data agnostic, application agnostic, and user agnostic, while further providing at least the capability of tracking and maintaining the version history of the configuration data.

8 Claims, 2 Drawing Sheets

SYSTEMS AND METHODS OF PROVISIONING DATA STORAGE AND RUNTIME CONFIGURATION IN TELECOMMUNICATIONS SYSTEMS AND DEVICES

CROSS REFERENCE TO RELATED APPLICATIONS

This application is a divisional of U.S. patent application Ser. No. 13/364,732 filed Feb. 2, 2012 entitled SYSTEMS AND METHODS OF PROVISIONING DATA STORAGE AND RUNTIME CONFIGURATION IN TELECOMMUNICATIONS SYSTEMS AND DEVICES.

FIELD OF THE INVENTION

The present application relates generally to telecommunications systems and devices, and more specifically to systems and methods of provisioning data storage and runtime configuration in telecommunications systems and devices.

BACKGROUND

Telecommunications systems and devices, such as access systems, network management systems, media switching centers, cross-connects, session border controllers, etc., can be adapted via configuration data to provide specific functionality for a target application. Based on such configuration data, control software within the telecommunications systems and devices can control the respective systems and devices to satisfy the requirements of the target application. For example, such configuration data can be specified for a session border controller to satisfy the requirements of access and interconnect applications within mobile and/or fixed voice-over-Internet protocol (such voice-over-Internet protocol is also referred to herein as "VoIP") networks. By adapting the session border controller using such configuration data, the session border controller can be effectively controlled to provide security for the interconnect and access network infrastructure, thereby assuring that VoIP services are made continuously available while maintaining a high level of system performance.

In typical telecommunications systems and devices, large amounts of complex configuration data must generally be stored and managed. Further, within a typical target application, such configuration data generally has to be accessed in a controlled manner, and the history of any changes made to the configuration data has to be tracked and maintained. Moreover, users of such telecommunications systems and devices generally require the capabilities of rolling back such changes to the configuration data, as required and/or as desired, and successfully synchronizing the configuration data across other telecommunications systems and/or devices over a network. However, prior attempts to provide such functionality in telecommunications systems and devices have generally not been suited for use in real-time applications that require fast, dynamic access to configuration data.

It would therefore be desirable to have improved systems and methods of provisioning data storage and runtime configuration in telecommunications systems and devices that better address the issues relating to the storage and management of data, such as configuration data, in real-time applications.

BRIEF SUMMARY OF THE INVENTION

In accordance with the present application, improved systems and methods of provisioning data storage and runtime configuration in telecommunications systems and devices are disclosed. The presently disclosed systems and methods employ at least one decentralized revision control system as a data repository for storing data, such as configuration data, and at least one data provisioning component as an interface for accessing the configuration data stored in the data repository. By employing the decentralized revision control system in conjunction with the data provisioning component, the presently disclosed systems and methods can beneficially provide a data storage and runtime configuration provisioning framework that is data agnostic, application agnostic, and user agnostic, while further providing at least the capability of tracking and maintaining the version history of the configuration data.

In accordance with a first aspect, an exemplary system for provisioning data storage and runtime configuration in telecommunications systems and devices (such an exemplary system is also referred to herein as a/the "data provisioning and runtime configuration system") includes the decentralized revision control system, and one or more functional components including at least the data provisioning component. For example, the decentralized revision control system can be implemented using the Git revision control system, or any other suitable decentralized revision control system. The functional components can further include a view manager component, as well as one or more predetermined application program components in support of the functionality provided by the data provisioning and runtime configuration system. In accordance with a first exemplary aspect, a user can access the data provisioning and runtime configuration system over a network via any suitable client, including, but not limited to, a web client, which is communicably coupleable to the view manager component via a network connection. The view manager component can be implemented as any suitable server interface, including, but not limited to, a web server interface, for providing an overall view of the current state of the system configuration. Using the web client, the user can access the view manager component over the network via a web browser, which is communicably coupleable to the web server interface of the view manager component via the network connection. The view manager component is communicably coupled to the data provisioning component, which, in turn, is communicably coupled to the decentralized revision control system. In further accordance with the first exemplary aspect, data, such as configuration data, including but not limited to real-time data, can be stored in the data repository of the decentralized revision control system as objects (such objects are also referred to herein as "data objects"). Using the web browser, the user can communicate with the view manager component over the network connection to request access to, additions to, updates to, and/or deletions of specific data objects stored in the data repository. The view manager component is operative to communicate with the data provisioning component to implement such access to, additions to, updates to, and/or deletions of such data objects, as requested by the user. In accordance with a second exemplary aspect, the data provisioning component is operative to send commands, e.g., system calls, to the data repository over a source code management (SCM) interface of the decentralized revision control system, thereby implementing the requested access to, additions to, updates to, and/or deletions of such data objects stored in the data repository. In further accordance with the second exemplary aspect, the user can communicate with the data provisioning component to subscribe, via at least one subscription message, to specific data objects stored in the data repository, e.g., for the purpose of being notified whenever certain characteristics of such data objects change, as determined by the data provisioning component. In the event the data provisioning component determines that such certain characteristics of the data objects have, in fact, changed, the data provisioning component can notify the subscribing user of the change(s). In accordance with a third exemplary aspect, one or more of the predetermined application program components can register, with the data provisioning component, one or more application entities that may require access to the data objects stored in the data repository. The registered application entities are each operative to communicate with the data provisioning component to request access to specific data objects stored in the data repository. Further, the data provisioning component is operative to implement such access to such data objects, as requested by the respective application entities. The registered application entities are each further operative to communicate with the data provisioning component to subscribe to specific data objects, e.g., for the purpose of being notified whenever certain characteristics of such data objects change, as determined by the data provisioning component. In the event the data provisioning component determines that such certain characteristics of the data objects have, in fact, changed, the data provisioning component notifies the respective application entities, as appropriate.

In accordance with a second aspect, two or more data provisioning and runtime configuration systems can be implemented as peer systems. Each of the peer systems can include a respective decentralized revision control system, and a respective data provisioning component. Each of the peer systems can further include a view manager component, as well as one or more predetermined application program components. The decentralized revision control systems, the data provisioning components, the view manager component(s), and the predetermined application program component(s) included in the respective peer systems are each configured to operate as described above with reference to the first aspect of the data provisioning and runtime configuration system. The data provisioning components included in the respective peer systems are further operative to communicate with one another over at least one messaging interface via a first network connection. Moreover, the decentralized revision control systems included in the respective peer systems are further operative to communicate with one another via a second network connection, in accordance with a predetermined version control communication protocol. In the event one of the data provisioning components included in the respective peer systems determines that certain characteristics of specific data objects stored in the data repository of the decentralized revision control system coupled thereto have changed, the data provisioning component can send, over the messaging interface via the first network connection, a notification of the changes to the data provisioning component included in the other peer system. Further, the data provisioning components included in the peer systems can send commands, e.g., system calls, to the respective decentralized revision control systems coupled thereto, thereby causing the respective decentralized revision control systems to synchronize the changes to the data objects stored therein via the second network connection, in accordance with the predetermined version control communication protocol.

By employing the decentralized revision control system in conjunction with the data provisioning component, the data provisioning and runtime configuration system can beneficially provide a data storage and runtime configuration provisioning framework that is data agnostic, application agnostic, and user agnostic, while further providing at least the capability of tracking and maintaining the version history of data, such as configuration data, including but not limited to real-time data. Further, by implementing two or more such data provisioning and runtime configuration systems as peer systems, any changes to the data objects stored in the data repositories of the respective peer systems can be beneficially synchronized using a predetermined version control communication protocol, thereby assuring that none of the data are lost in the event of a failover.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The disclosure of U.S. patent application Ser. No. 13/364,732 filed Feb. 2, 2012 entitled SYSTEMS AND METHODS OF PROVISIONING DATA STORAGE AND RUNTIME CONFIGURATION IN TELECOMMUNICATIONS SYSTEMS AND DEVICES is hereby incorporated herein by reference in its entirety.

Systems and methods of provisioning data storage and runtime configuration in telecommunications systems and devices are disclosed. The presently disclosed systems and methods employ at least one decentralized revision control system as a data repository for storing data, such as configuration data, and at least one data provisioning component as an interface for accessing the configuration data stored in the data repository. By employing the decentralized revision control system in conjunction with the data provisioning component, the presently disclosed systems and methods can beneficially provide a data storage and runtime configuration provisioning framework that is data agnostic, application agnostic, and user agnostic, while further providing at least the capability of tracking and maintaining the version history of the configuration data.

Figure 1:
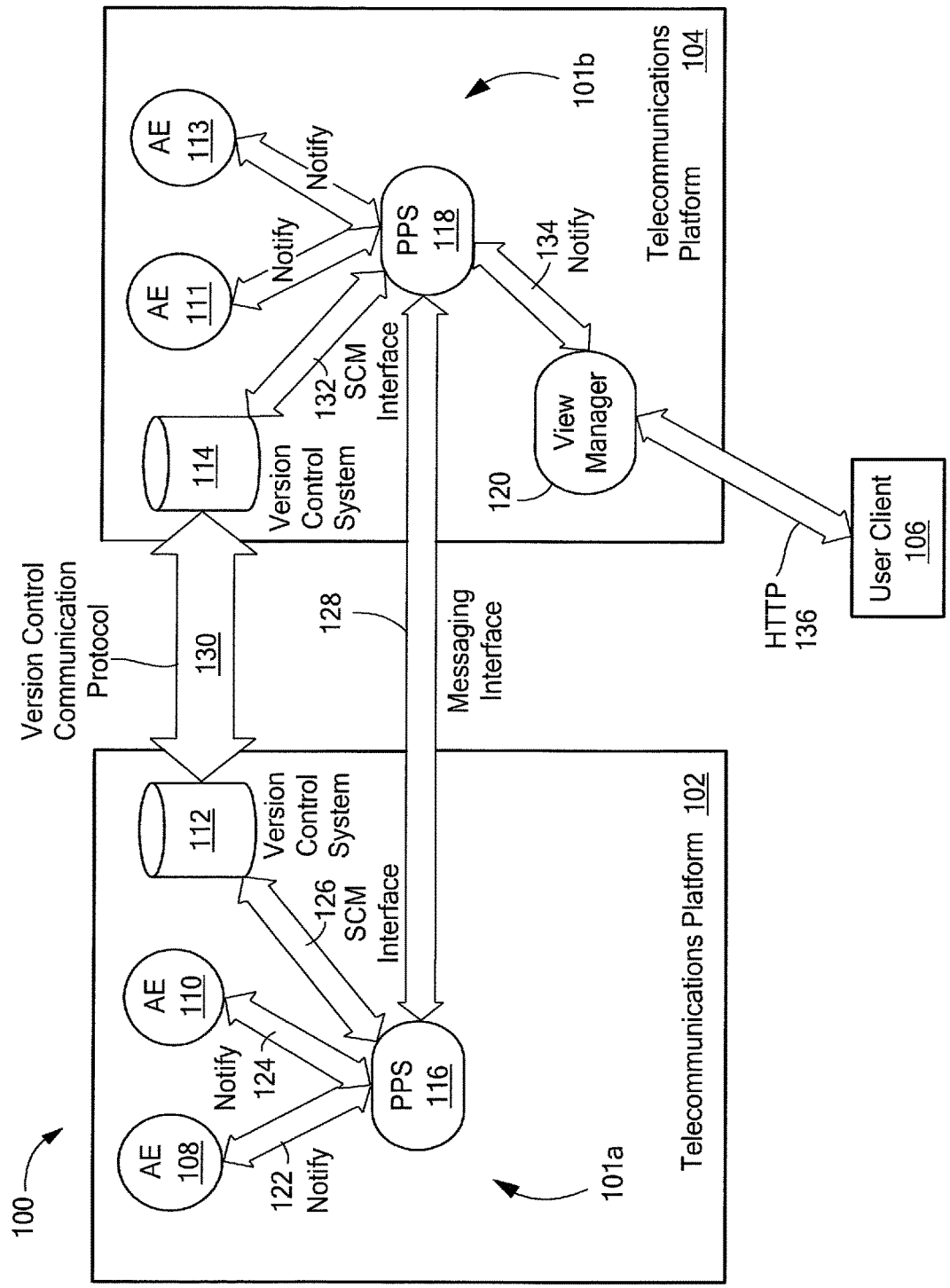
FIG. 1 is a block diagram of an exemplary architecture for provisioning data storage and runtime configuration in telecommunications systems and devices, in accordance with an exemplary embodiment of the present application.

FIG. 1 depicts an illustrative embodiment of an exemplary architecture 100 for provisioning data storage and runtime configuration in telecommunications systems and devices, in accordance with an exemplary embodiment of the present application. The exemplary architecture 100 includes a plurality of telecommunications systems or devices 102, 104 (such telecommunications systems or devices are also referred to herein as "telecommunications platforms"). Telecommunications platforms 102, 104 can be implemented as access systems, network management systems, media switching centers, cross-connects, session border controllers, as examples, and/or as any other suitable telecommunications systems or devices.

In accordance with the illustrative embodiment of FIG. 1, telecommunications platform 102 includes a data provisioning and runtime configuration system 101a, and telecommunications platform 104 includes a data provisioning and runtime configuration system 101b. Each of the data provisioning and runtime configuration systems 101a, 101b includes a decentralized revision control system, and one or more functional components including at least a data provisioning component. Specifically, the data provisioning and runtime configuration system 101a includes a decentralized revision control system 112 and a data provisioning component 116. Similarly, the data provisioning and runtime configuration system 101b includes a decentralized revision control system 114 and a data provisioning component 118. With reference to telecommunications platform 104, the functional components within the data provisioning and runtime configuration system 101b further include a view manager component 120. Moreover, with reference to telecommunications platform 102, the functional components within the data provisioning and runtime configuration system 101a further include one or more predetermined application program components 108, 110 in support of the functionality provided by telecommunications platform 102.

It is noted that the functional components within the data provisioning and runtime configuration system 101b can further include one or more predetermined application program components 111, 113 in support of the functionality provided by telecommunications platform 104.

As shown in FIG. 1, one or more user clients, such as a user client 106, can access the data provisioning and runtime configuration system 101b within telecommunications platform 104 over a network. The user client 106 can be implemented as a web client, as an example, or as any other suitable client communicably coupleable to the view manager component 120 via a network connection 136. Moreover, the view manager component 120 can be implemented as any suitable server interface, including, but not limited to, a web server interface, for providing an overall view of the current state of the system configuration. For example, the user client 106 implemented as a web client can access the data provisioning and runtime configuration system 101b over the network via a web browser communicably coupled to the web server interface of the view manager component 120. The view manager component 120 is communicably connected to the data provisioning component 118, which, in turn, is communicably connected to the decentralized revision control system 114. In further accordance with the illustrative embodiment of FIG. 1, data, such as configuration data, including but not limited to real-time data, can be stored in a data repository of the decentralized revision control system 114 as objects (such objects are also referred to herein as "data objects"). For example, the decentralized revision control systems 112, 114 can each be implemented using any suitable decentralized revision control system, such as the Git revision control system that provides at least one data repository with at least history and revision capabilities and is not dependent on network access and/or on a central server.

In accordance with an exemplary mode of operation of the data provisioning and runtime configuration system 101b within telecommunications platform 104, the user client 106 communicates, using the web browser, with the view manager component 120 over the network connection 136 to request access to, and/or one or more manipulations of, specific data objects stored in the data repository of the decentralized revision control system 114. For example, such manipulations of data objects can include one or more additions to, updates to, and/or deletions of the respective data objects. Further, the user client 106 can communicate with the view manager component 120 over the network connection 136 using the hypertext transfer protocol (HTTP), or any other suitable communications protocol. The view manager component 120 is operative to communicate with the data provisioning component 118 over a connection 134 to implement such access to, additions to, updates to, and/or deletions of the specific data objects contained in the decentralized revision control system 114, as requested by the user client 106. Moreover, the data provisioning component 118 is operative to send commands, e.g., system calls, to the decentralized revision control system 114 over an interface 132 of the decentralized revision control system 114, thereby implementing the requested access to, additions to, updates to, and/or deletions of the specific data objects stored in the data repository of the decentralized revision control system 114. For example, the interface 132 can be implemented as a source code management (SCM) interface of the decentralized revision control system 114, or any other suitable interface. In further accordance with this exemplary mode of operation of the data provisioning and runtime configuration system 101b, the user client 106 can communicate with the data provisioning component 118 to subscribe, via at least one subscription message, to the specific data objects stored in the data repository of the decentralized revision control system 114. For example, the user client 106 can subscribe to the specific data objects for the purpose of being notified whenever certain characteristics of such data objects change, as determined by the data provisioning component 118. In the event the data provisioning component 118 determines that such certain characteristics of the data objects have, in fact, changed, the data provisioning component 118 generates and sends at least one notification of the changes to the view manager component 120 over the connection 134, and the view manager component 120, in turn, notifies the user client 106 of the changes over the network connection 136, for example, via the web browser. In accordance with an exemplary mode of operation of the data provisioning and runtime configuration system 101a within telecommunications platform 102, each of the predetermined application program components 108, 110 can register, with the data provisioning component 116, one or more application entities that may require access to the data objects stored in the data repository of the decentralized revision control system 112. For example, the predetermined application program components 108, 110 can each register one or more application entities. The application entities registered by the application program components 108, 110 are operative to communicate with the data provisioning component 116 over connections 122, 124, respectively, to request access to, additions to, updates to, and/or deletions of specific data objects stored in the data repository of the decentralized revision control system 112. Further, the data provisioning component 116 is operative to implement such access to, additions to, updates to, and/or deletions of such data objects, as requested, on behalf of the respective application entities. The registered application entities are each further operative to communicate with the data provisioning component 116 to subscribe to specific data objects stored in the data repository of the decentralized revision control system 112. For example, each registered application entity can subscribe to the specific data objects for the purpose of being notified whenever certain characteristics of such data objects change, as determined by the data provisioning component 116. In the event the data provisioning component 116 determines that such certain characteristics of the data objects have, in fact, changed, the data provisioning component 116 can notify the respective application entities over the connections 122, 124, as appropriate.

In further accordance with the illustrative embodiment of FIG. 1, the data provisioning and runtime configuration system 101*a* within telecommunications platform 102, and the data provisioning and runtime configuration system 101*b* within telecommunications platform 104, can be implemented as peer systems. In such an implementation of the data provisioning and runtime configuration systems 101*a*, 101*b*, the data provisioning components 116, 118 included in the respective systems 101*a*, 101*b* are operative to communicate with one another over a messaging interface 128. Moreover, the decentralized revision control systems 112, 114 included in the respective systems 102, 104 are operative to communicate with one another via a network connection 130, in accordance with a predetermined version control communication protocol, such as HTTP, UUCP, FTP, SMTP, NNTP, or any other suitable communications protocol.

In accordance with an exemplary mode of operation of the data provisioning and runtime configuration systems 101*a*, 101*b* implemented as peer systems, in the event the data provisioning component 118 included in the data provisioning and runtime configuration system 101*b* determines that certain characteristics of data objects stored in the data repository of the decentralized revision control system 114 coupled thereto have changed, the data provisioning component 118 sends, over the messaging interface 128, a notification of the changes to the data provisioning component 116. Further, the data provisioning components 116, 118 send commands, e.g., system calls, to the decentralized revision control systems 112, 114, respectively, thereby causing the decentralized revision control systems 112, 114 to synchronize the changes to the data objects stored therein via the network connection 130, in accordance with the predetermined version control communication protocol. For example, each of the data repositories of the respective decentralized revision control systems 112, 114 may contain configuration data. Further, the data repository of one of the decentralized revision control systems 112, 114 may contain at least a portion of the configuration data stored in the other one of the decentralized revision control systems 112, 114. Moreover, each of the decentralized revision control systems 112, 114 can synchronize the changes to the configuration data in the data objects stored therein by fetching such changes to the data objects over the network connection 130, using HTTP or any other suitable communications protocol, In addition, the data provisioning component 116 can notify the registered application entities of the changes to the data objects over the connections 122, 124, as appropriate. By implementing the data provisioning and runtime configuration systems 101*a*, 101*b* as peer systems, a high availability deployment can be achieved that assures that none of the data stored in the data repositories of the decentralized revision control systems 112, 114 are lost in the event of a failover.

Figure 2:
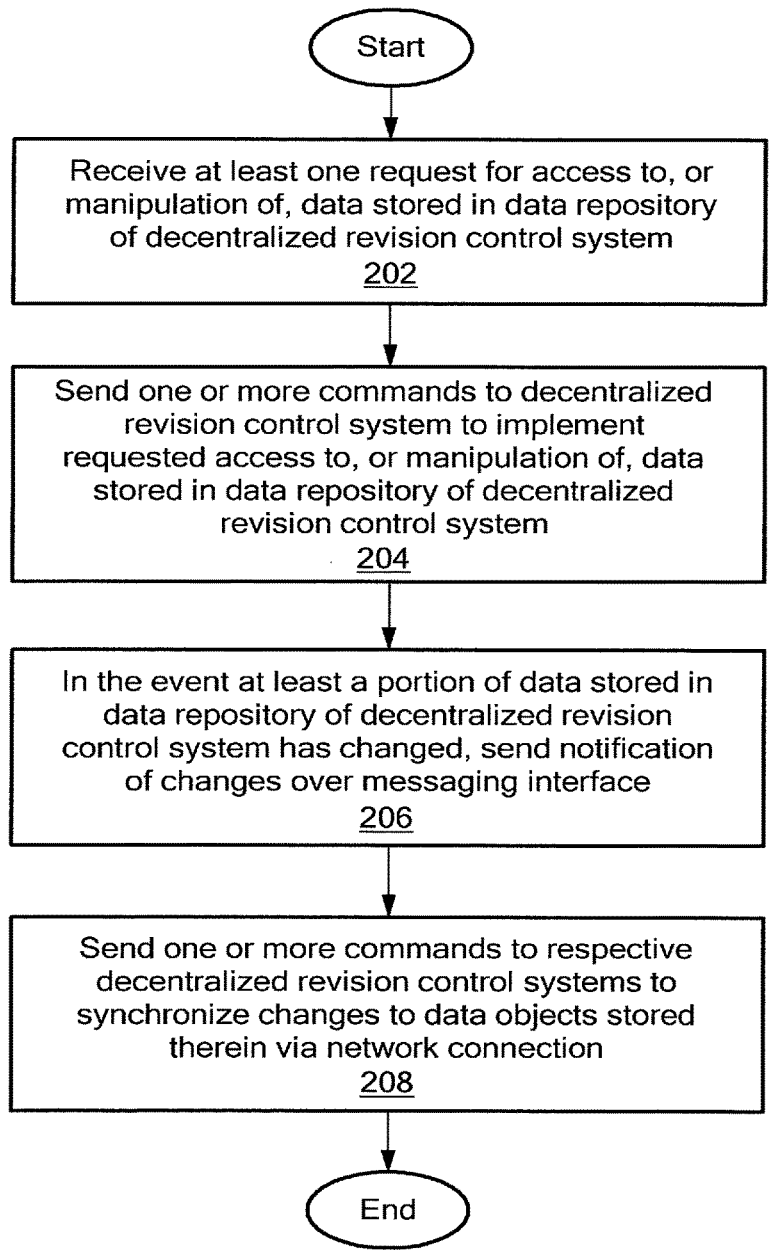
FIG. 2 is a flow diagram of an exemplary method of operating an exemplary data provisioning and runtime configuration system within the exemplary architecture of FIG. 1.

An exemplary method of operating a data provisioning and runtime configuration system within the architecture 100 is described below with reference to FIG. 2, as well as FIG. 1. As depicted in step 202 (see FIG. 2), at least one request for access to, or manipulation of, data stored in the data repository of the decentralized revision control system 114 (see FIG. 1) is received at the data provisioning component 118 (see FIG. 1) within telecommunications platform 104 (see FIG. 1). As depicted in step 204 (see FIG. 2), one or more commands are sent, by the data provisioning component 118 (see FIG. 1), to the decentralized revision control system 114 (see FIG. 1) to implement the requested access to, or manipulation of, the data stored in the data repository of the decentralized revision control system 114 (see FIG. 1). As depicted in step 206 (see FIG. 2), in the event at least a portion of the data stored in the data repository of the decentralized revision control system 114 (see FIG. 1) has changed due to the requested access to, or manipulation of, the data, a notification of the changes is sent, by the data provisioning component 118 (see FIG. 1) over the messaging interface 128 (see FIG. 1), to the data provisioning component 116 (see FIG. 1) within telecommunications platform 102 (see FIG. 1). As depicted in step 208 (see FIG. 2), one or more commands are sent, by the data provisioning components 116, 118 (see FIG. 1), to the respective decentralized revision control systems 112, 114 (see FIG. 1) connected thereto, causing the decentralized revision control systems 112, 114 (see FIG. 1) to synchronize the changes to the data objects stored therein via the network connection 130 (see FIG. 1).

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A system for provisioning data storage and runtime configuration in telecommunications systems or devices, comprising:

a first telecommunications platform including a first decentralized revision control system including a first data repository, the first data repository being operative to store, as one or more real-time data objects, at least first configuration data for a first telecommunications system or device, the first telecommunications platform further including a first data provisioning component communicably connected to the first decentralized revision control system; and a second telecommunications platform including a second decentralized revision control system including at least one second data repository, the second data repository being operative to store at least second configuration data for at least one second telecommunications system or device, the second decentralized revision control system being communicably connectable to the first decentralized revision control system, the second configuration data including at least a portion of the first configuration data, the second telecommunications platform further including a second data provisioning component communicably connected to the second decentralized revision control system, the second data provisioning component being communicably connectable to the first data provisioning component, wherein, in the event at least one characteristic of at least one of the one or more real-time data objects stored in the first data repository has changed:

the first data provisioning component is operative to generate a first notification of the at least one changed characteristic of the at least one of the one or more real-time data objects, and to send the first notification to the second data provisioning component; and having sent the first notification to the second data provisioning component, the first data provisioning component and the second data provisioning component are operative to send one or more system calls to the first decentralized revision control system and the second decentralized revision control system, respectively, thereby causing the first and second decentralized revision control systems to synchronize the at least one changed characteristic of the at least one of the one or more real-time data objects with the portion of the first configuration data stored in the second data repository of the second decentralized revision control system.

2. The system of claim 1 wherein the first decentralized revision control system and the second decentralized revision control system are each implemented using the Git revision control system.

3. The system of claim 1 further comprising:

a client-server interface communicably connected to the first data provisioning component of the first telecommunications platform, the client-server interface being communicably connectable to a user device, wherein the first data provisioning component is further operative, without being dependent upon network access:

to receive at least one subscription message for subscribing to the at least one of the one or more real-time data objects;

to generate a second notification pertaining to the at least one changed characteristic of the subscribed at least one of the one or more real-time data objects; and to send the second notification to the client-server interface for notifying a user at the user device.

4. The system of claim 1 wherein the first telecommunications platform and the second telecommunications platform are peer systems.

5. A method of provisioning data storage and runtime configuration in telecommunications systems or devices, comprising:

storing, as one or more real-time data objects, at least first configuration data for a first telecommunications system or device in a first data repository of a first decentralized revision control system, the first decentralized revision control system being included in a first telecommunications platform, the first telecommunications platform including a first data provisioning component;

storing at least second configuration data for at least one second telecommunications system or device in at least one second data repository of at least one second decentralized revision control system, the second decentralized revision control system being included in a second telecommunications platform, the second telecommunications platform including a second data provisioning component, the second configuration data including at least a portion of the first configuration data;

in the event at least one characteristic of at least one of the one or more real-time data objects stored in the first data repository has changed:

generating, by the first data provisioning component, a first notification of the at least one changed characteristic of the at least one of the one or more real-time data objects; and sending, by the first data provisioning component, the first notification to the second data provisioning component;

in response to the sending of the first notification to the second data provisioning component, sending one or more system calls by the first data provisioning component and the second data provisioning component to the first decentralized revision control system and the second decentralized revision control system, respectively; and in response to the sending of the one or more system calls to the first and second decentralized revision control systems, synchronizing, by the first and second decentralized revision control systems, the at least one changed characteristic of the at least one of the one or more real-time data objects with the portion of the first configuration data stored in the second data repository of the second decentralized revision control system.

6. The method of claim 5 further comprising:

implementing each of the first decentralized revision control system and the second decentralized revision control system using the Git revision control system.

7. The method of claim 5 wherein a client-server interface is communicably connected to the first data provisioning component included in the first telecommunications platform, the client-server interface being communicably connectable to a user device, and wherein the method further comprises:
- in a receiving step, receiving, at the first data provisioning component, at least one subscription message for subscribing to the at least one of the one or more real-time data objects;
- generating, by the first data provisioning component, a second notification pertaining to the at least one changed characteristic of the subscribed at least one of the one or more real-time data objects; and
- sending, by the first data provisioning component, the second notification to the client-user interface for notifying a user at the user device,
- wherein the receiving step, the generating of the second notification, and the sending of the second notification are performed without being dependent upon network access.

8. The method of claim 5 further comprising:
implementing the first telecommunications platform and the second telecommunications platform as peer systems.

* * * * *